US007233343B2

(12) United States Patent
Turner et al.

(10) Patent No.: US 7,233,343 B2

(45) Date of Patent: Jun. 19, 2007

(54) SERIAL PRINTING WITH MULTIPLE TORSIONAL HINGED MEMS MIRRORS

(75) Inventors: Arthur Monroe Turner, Allen, TX (US); Andrew Steven Dewa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 395 days.

(21) Appl. No.: 10/995,813

(22) Filed: Nov. 24, 2004

(65) Prior Publication Data

US 2006/0109335 A1 May 25, 2006

(51) Int. Cl.
*G02B 26/10* (2006.01)
*B41J 2/47* (2006.01)

(52) U.S. Cl. .................................................... 347/243

(58) Field of Classification Search ............... 347/129, 347/132, 134, 233, 243
See application file for complete search history.

(56) References Cited

U.S. PATENT DOCUMENTS 6,965,177 B2 * 11/2005 Turner et al. ................. 310/38
2004/0256921 A1 * 12/2004 Turner et al. ................. 310/36

* cited by examiner

*Primary Examiner*—Huan Tran
(74) *Attorney, Agent, or Firm*—William B Kempler; W. James Brady; Frederick J. Telecky, Jr.

(57) ABSTRACT

System and method for operating four resonant torsional hinged mirrors such as torsional hinged MEMS devices at the same oscillating frequency suitable for use in a color printer requiring four serially arranged line printers.

24 Claims, 6 Drawing Sheets

SERIAL PRINTING WITH MULTIPLE TORSIONAL HINGED MEMS MIRRORS

TECHNICAL FIELD

The present invention relates generally to torsional hinged resonant devices and more specifically to the use of two or more torsional hinged resonant mirrors for use as drive engines or scan units in a laser printer.

BACKGROUND

Rotating polygon scanning mirrors are used in laser printers to provide a "raster" scan of the image of a modulated laser light source across a moving photosensitive medium, such as a rotating drum. Such a system requires that the rotation of the photosensitive drum and the rotating polygon mirror be synchronized so that the beam of light (laser beam) sweeps or scans across the rotating drum in one direction as a facet of the polygon mirror rotates past the laser beam. The next facet of the rotating polygon mirror generates a similar scan or sweep, which also traverses the rotating photosensitive drum but provides an image line that is spaced or displaced from the previous image line.

There have also been prior art efforts to use a less expensive flat mirror with a single reflective surface to provide a scanning beam. For example, a dual axis or single axis scanning mirror may be used to generate the beam sweep or scan instead of a rotating polygon mirror. The rotating photosensitive drum and the scanning mirror are synchronized as the photoresistive medium or drum rotates in a forward direction to produce a printed image line on the medium that is parallel with the modulated beam scan or sweep generated by the pivoting mirror and orthogonal to the movement of the photosensitive medium.

Single axis scanning mirrors may also be used to provide a resonant scan for use with a printer. However, the return scan or sweep will traverse a path on the moving photosensitive medium (i.e., typically a rotating drum), that is at an angle with the image line printed during the forward sweep. Consequently, most prior art uses of a single axis resonant mirror in a printer required that the modulation of the reflected light beam be interrupted as the mirror made the return sweep or completed its cycle. The modulated beam was turned on again as the beam started scanning in the original or forward direction. It has been discovered, however, that at sufficiently high print speeds, both the forward and reverse sweep may be used without orthogonal adjustments.

Texas Instruments presently manufactures torsional dual axis and single axis pivoting MEMS mirrors fabricated out of a single piece of material (such as silicon, for example) typically having a thickness of about 100–115 microns. The dual axis layout may, for example, consist of the mirror surface being supported on a gimbal frame by two silicon torsional hinges, whereas a single axis mirror is supported directly by a pair of torsional hinges.

The scanning mirror surface may be of any desired shape, although an elliptical shape having a long axis of about 4.0 millimeters and a short axis of about 1.5 millimeters is particularly useful. Such an elongated ellipse-shaped mirror is matched to the shape at which the angle of a light beam is received. The gimbal frame used by the dual axis mirror is attached to a support frame by another set of torsional hinges. These mirrors manufactured by Texas Instruments are particularly suitable for use as the scanning engine for high-speed laser printers and visual display.

Color printers typically combine four (4) different modulated beam scans (e.g., one black and three selected primary colors) that print on a photosensitive medium such as a rotating drum. Since the four scans for one particular line must be properly aligned if the color printing is to be satisfactory, it is important that the four beam scans and, consequently the rotating or pivoting mirrors, run at substantially the same precise speed. This is not a problem with the rotating polygon mirrors but is a difficult problem for resonant torsional hinged mirrors. The difficulty results from the fact that, although the resonant mirrors are designed to be identical, there will be oscillating frequency differences between about 3% to 5% for a 2 kHz resonant frequency mirror or about 80 Hz.

Such differences in the resonant frequency for single mirror printers may still provide a printed page that is well within all tolerance without any adjustments. Further, even if an adjustment is required, simply adjusting or calibrating the speed of the rotating drum to the pivoting speed of the oscillating single mirror is simple and straightforward. However, if four oscillating mirrors each have a different resonant frequency, the speed of the rotating photosensitive drum can only be synchronized or adjusted with respect to one of the four resonant mirrors. The stringent alignment requirements of color printers simply make this unacceptable. Mechanisms in the paper path for compensating for different scan speeds could be used but would significantly increase the cost of the printer.

Therefore, it would be advantageous to use inexpensive resonant scanning mirrors with presently available inexpensive paper path mechanisms to produce high quality color printing.

SUMMARY OF THE INVENTION

These and other problems are generally solved or circumvented, and technical advantages are generally achieved, by preferred embodiments of the present invention. The apparatus and methods of the present invention require at least two and preferably four scan units such as MEMS torsional hinged mirrors that operate at the same frequency. These mirrors each oscillate at a frequency about their torsional hinges that is equal to or very close to their resonant frequency. The resonant frequency of each of the mirror is manufactured to be within a selected tolerance or band of frequencies. Further, each of the devices is manufactured to maintain at least a minimum selected oscillation amplitude across all frequencies within the selected band of frequencies or tolerance values. There is included a drive mechanism, such as for example, a magnetic drive mechanism for each of the at least two torsional hinged mirrors, and this drive mechanism is capable of establishing and maintaining oscillation of the mirror it is associated with at any selected frequency that is within the manufacturing tolerances; that is within the allowed band of frequencies. The drive mechanism is responsive to or adjusted by an input signal, which is provided to each of the drive mechanism so that the drive mechanism operate their respective mirrors devices at the selected frequency and at an oscillation amplitude that is above a selected threshold value. According to one embodiment, the selected frequency is the resonant frequency of one of the at least two torsional hinged mirrors and the other torsional hinged mirror(s) are then driven off of their resonant frequency to maintain oscillations at the selected frequency. In another embodiment of the invention, the at least two mirrors are used in a printing apparatus and may comprise single axis full hinged mirrors, single axis half hinged mirrors, or dual axis full hinged mirrors.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

MEMS (mechanical electro mechanical) devices having torsional hinges to provide resonant oscillations are manufactured by Texas Instruments Incorporated of Dallas, Tex. Resonant torsional hinged mirrors have found increasing acceptance as drive engines or scan units for various types of display devices and especially laser printers. Further, various types of resonant torsional mirrors may be used in such printers. For example, a resonant torsional mirror may pivot around two orthogonal axis. That is, a first pair of hinges are provided for high-speed resonant oscillations to generate the laser beam sweeping motion and a second pair of hinges provide the slower orthogonal motion.

Figure 1A:
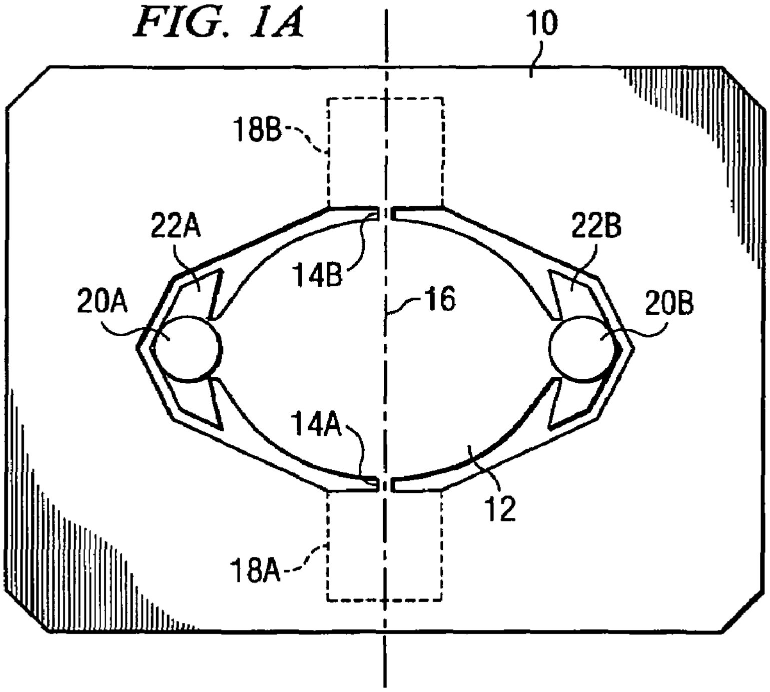
FIGS. 1A and 1B illustrate two examples of a single axis mirror suitable for use with the present invention.
Figure 1B:
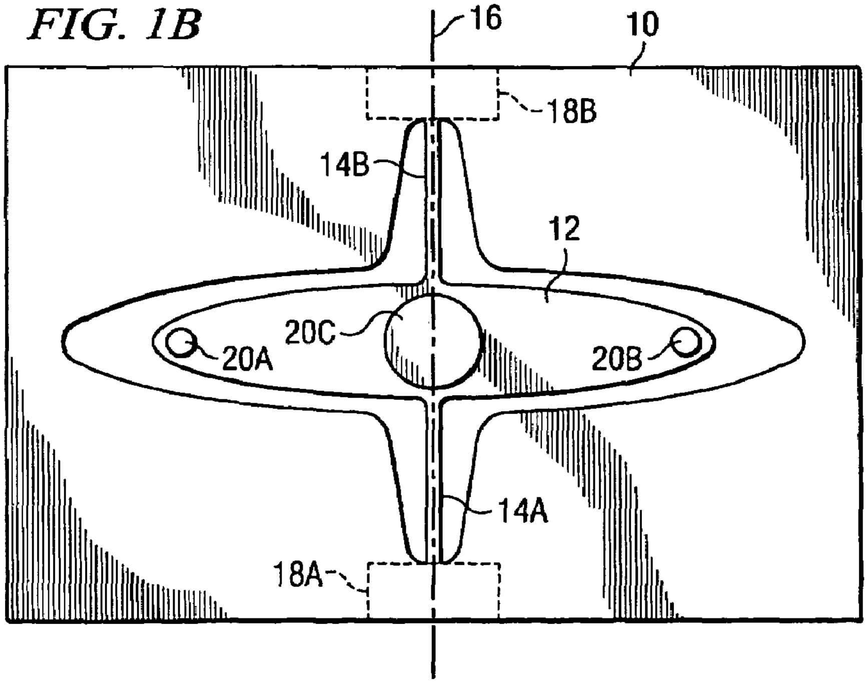

FIGS. 1A and 1B illustrate single axis torsional mirror devices. Each of the devices of FIGS. 1A and 1B include a support member 10 supporting the mirror portion or reflective surface 12, which may be substantially any shape but for printer applications the elongated ellipse shape of FIG. 1B is preferred. The pivoting mirror is supported by a single pair of torsional hinges 14*a* and 14*b*. Thus, it will be appreciated that if the mirror portion 12 can be maintained in an oscillation state around axis 16 by a drive mechanism, such a mirror could be used to cause a sweeping light beam to repeatedly move across a photosensitive medium, such as for example, a rotating drum.

It will also be appreciated that an alternate embodiment of a single axis mirror may not require the support member or frame 10 as shown in FIGS. 1A and 1B. For example, as shown in both figures, the torsional hinges 14*a* and 14*b* may simply extend to a pair of hinge anchor pads 18*a* and 18*b* as shown in dotted lines. The mirror 12, may be suitably polished on its upper surface to provide a specular or mirror surface.

The single layered silicon mirrors are typically MEMS (micro-electric mechanical systems) type mirrors manufactured from a slice of single crystal silicon. Further, because of the advantageous material properties of single crystalline silicon, MEMS based mirrors have a very sharp torsional resonance. The Q of the torsional resonance typically is in the range of 100 to over 1000. This sharp resonance results in a large mechanical amplification of the device's motion at a resonance frequency versus a non-resonant frequency. Therefore, it is typically advantageous to pivot a device about the scanning axis at the resonant frequency. This dramatically reduces the power needed to maintain the mirror in oscillation.

There are many possible drive mechanisms available to provide the oscillation or pivoting motion if the mirror is intended to provide an oscillating beam sweep along the scan axis. For example, FIG. 1A illustrates a magnetic driven mirror having a pair of permanent magnets 20*a* and 20*b* mounted on tabs 22*a* and 22*b* respectively. The permanent magnets 20*a* and 20*b* interact with a pair of coils (not shown and to be discussed later) located below the pivoting structure. The mechanical motion of the mirror in the scan axis, or about the hinges 14*a* and 14*b*, is typically required to be greater than 15 degrees and may be as great as 30 degrees. Rather than being driven by a pair of magnets 20*a* and 20*b* shown in dotted lines, FIG. 1B illustrates the use of a single magnet 20*c* centrally located on the mirror 12. The drive mechanism for a centrally located single magnet 20*c* is also discussed below.

Further, by carefully controlling the dimension of hinges 14*a* and 14*b* (i.e., width, length and thickness) the mirror may be manufactured to have a natural resonant frequency which is substantially the same as the desired operating pivoting speed or oscillating frequency of the mirror. Thus, by manufacturing a mirror with a high-speed resonant frequency substantially equal to the desired pivoting speed or oscillating frequency, the power loading may be significantly reduced.

Figure 2A:
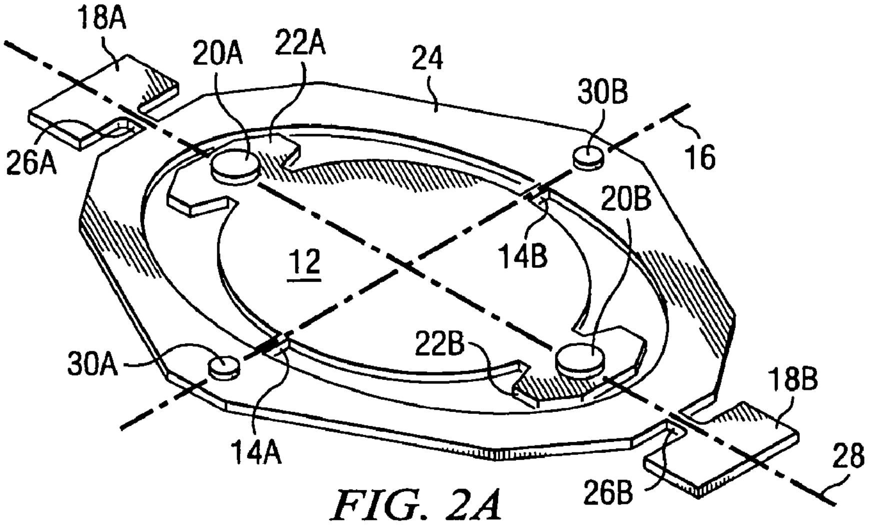
FIGS. 2A and 2B are examples of dual axis mirrors suitable for use with the present invention.
Figure 2B:
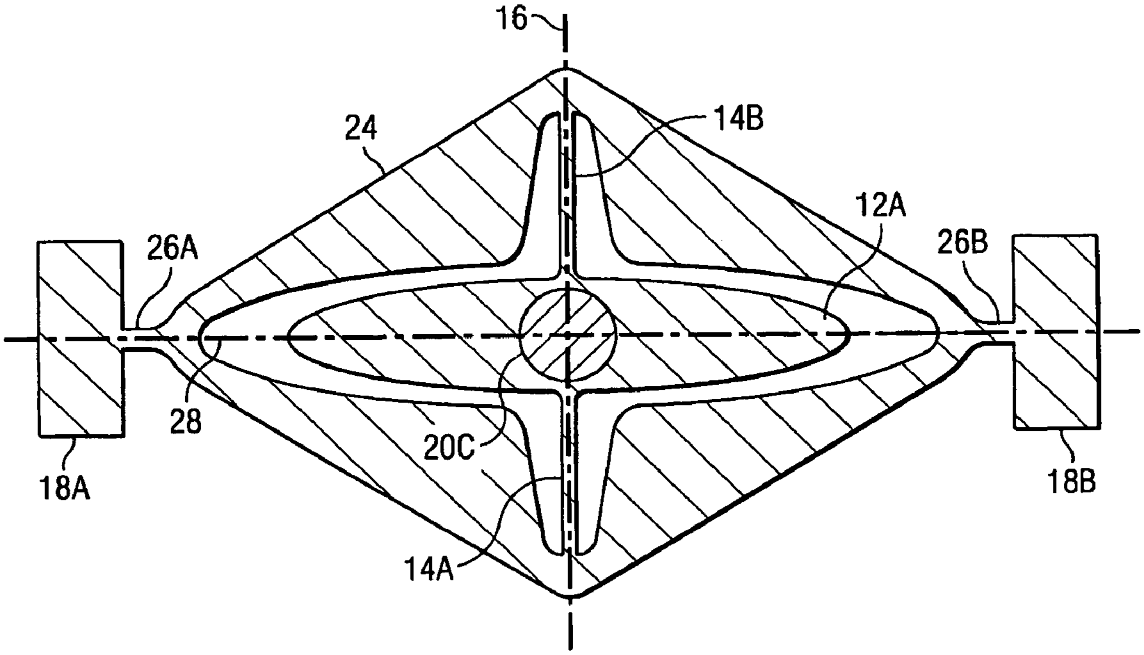

According to another embodiment, a single dual axis mirror may be used in a laser printer. Pivoting motion about one of the mirrors axes provides the resonant oscillations, while movement about the second one of the mirrors axes provides the orthogonal movement. FIGS. 2A and 2B illustrate two dual axis mirrors that could be adapted to provide movement of a light beam for either a display or a printer. As can readily be seen, these mirrors are similar to the single axis mirrors of FIGS. 1A and 1B, respectively, discussed above. However, instead of the primary or resonant hinges 14*a* and 14*b*, which lie along resonant axis 16, being attached directly to anchor pads 18*a* and 18*b*, the primary hinges 14*a* and 14*b* are connected to a gimbals member 24, which in turn is connected to the anchor pads 18*a* and 18*b* by a second pair of hinges 26*a* and 26*b*. Hinges 26*a* and 26*b* provide pivotal motion to the mirror 12 along a secondary axis 28, which is substantially orthogonal to axis 16.

As shown, FIG. 2A is a perspective view of one embodiment of a single two-axis bi-directional mirror providing resonant movement about the first axis 16 and movement about a second axis 28 that is substantially orthogonal to the first axis. The mirror pivots about one axis to provide back and forth modulated beam sweeps or scans at its resonant frequency across a projection display screen or moving photosensitive medium. Movement about the second axis is used for adjusting the beam sweep in a direction orthogonal to the back and forth pivoting of the reflective surface or mirror portion 12 to maintain spaced parallel image lines produced by a resonant raster beam sweep. The orthogonal movement of the mirror portion 12 may be provided by the two permanent magnets 30*a* and 30*b* mounted on gimbals member 24 and on each side of secondary axis 28. As shown, the mirror is illustrated as being suitable for being mounted on a support structure, and may be formed from a single piece of substantially planar material (such as silicon) by techniques similar to those used in semiconductor art. As discussed above, the functional or moving components include, for example, a pair of support members or anchors 18*a* and 18*b*, the intermediate gimbals portion 24 and the inner mirror or reflective surface portion 12.

FIG. 2B is an alternate embodiment of a dual axis mirror having an elongated oval mirror portion 12*a* and a centrally located drive magnet 20*c* for providing the resonant motion. Since the remaining elements of the device shown in FIG. 2B operate or function in the same manner as equivalent elements of FIG. 2A, the two figures use common reference numbers.

As should be appreciated by those skilled in the art, by increasing the ratio of the speed of resonant oscillations of a resonant mirror with respect to the printer speed (i.e., pages per minute) high quality printers may also be manufactured that only require a mirror to provide the resonant oscillations of the light or laser beam. That is, orthogonal movement or corrections are not necessary and only one single axis bidirectional mirror is used.

Figure 3:
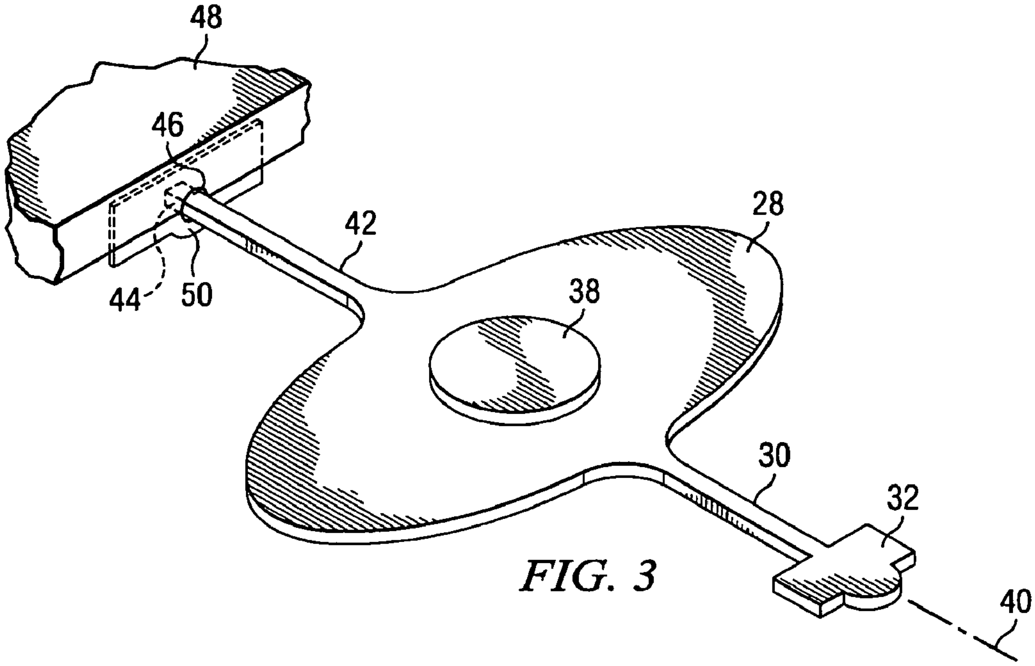
FIGS. 3 and 3A illustrate a single axis half hinged mirror suitable for use with the present invention.
Figure 3A:
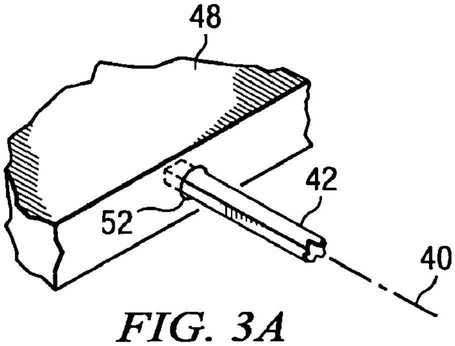

Recently, it has been discovered that a mirror with a single hinge (referred to as half hinged) torsional mirror arrangement, such as shown in FIGS. 3 and 3A, have some advantages over a dual hinge (referred to as a full hinged) mirror. More specifically, although the resonant frequency of a half hinged mirror is typically less than that of a full hinged mirror, the half hinged mirror is substantially unaffected by temperature variations that cause stress on the full hinged mirrors.

Referring now to FIGS. 3 and 3A, there is shown a torsional hinge mirror having a single hinge. As shown in FIG. 3, there is an elongated ellipse mirror portion 28 supported by a single torsional hinge 30. The other end of the torsional hinge 30 is part of an anchor member 32. The anchor member may include a complete frame around the mirror structure (not shown), or simply be in anchor pad 32 as shown in FIG. 3. Also included is a single permanent magnet 38 that operates with a magnetic coil (not shown) for providing pivotal forces. Thus, as seen, the mirror structure of FIG. 3 will pivot around its pivot axis 40 on the single torsional hinge 30 at a selected frequency, and preferably at the resonant frequency of the torsional mirror and hinge structure. A mirror structure similar to that shown in FIG. 3 has been found to operate quite satisfactorily at its resonant frequency. However, as will be appreciated, because the mirror portion is supported as a cantilever member by the single torsional hinge 30, the mirror is susceptible to forces in a plane perpendicular to the axis 40 of the mirror device. Consequently, as shown, there is included an axial member 42 extending along the selected axis and away from the mirror structure. As shown, the axial member does not include another anchor pad but will be supported in a plane perpendicular to the axis as illustrated in both FIGS. 3 and 3A.

As will be appreciated by those skilled in the art, the anchor pad 32 will be attached to a supporting structure (not shown) and the extreme end 44 of the axial member may lay in a groove 46 on top of a portion 48 of the support member and then held in place via an axial hub or support member 50. Thus, the axial member 42 is free to rotate, but is substantially restrained from movement in a plane perpendicular to the selected axis 40. It will also be appreciated by those skilled in the art that the support structure may simply comprise a hole or aperture 52 drilled into the support structure for receiving the extreme end of the axial member. Such an embodiment is shown in FIG. 3A.

Figure 4A:
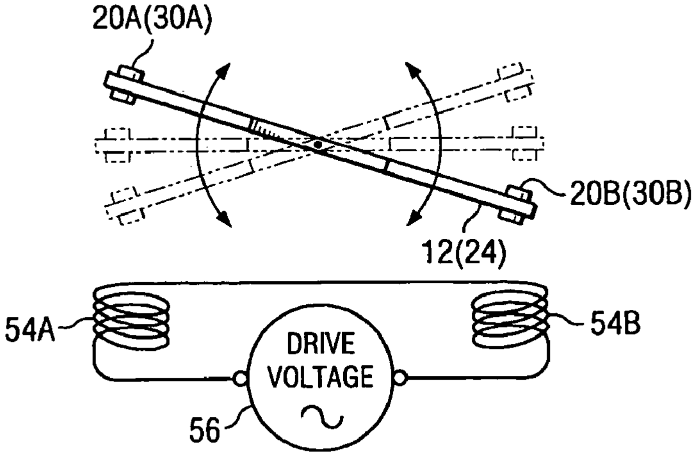
FIGS. 4A, 4B and 4C illustrate three embodiments of magnetic resonant drives suitable for use with the present invention.
Figure 4B:
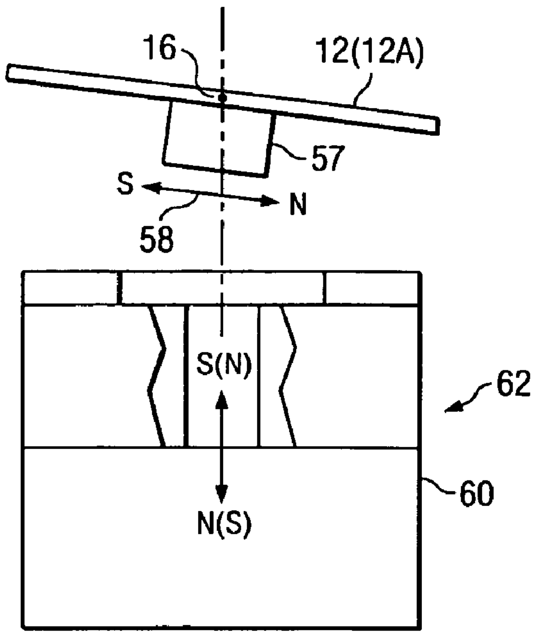
Figure 4C:
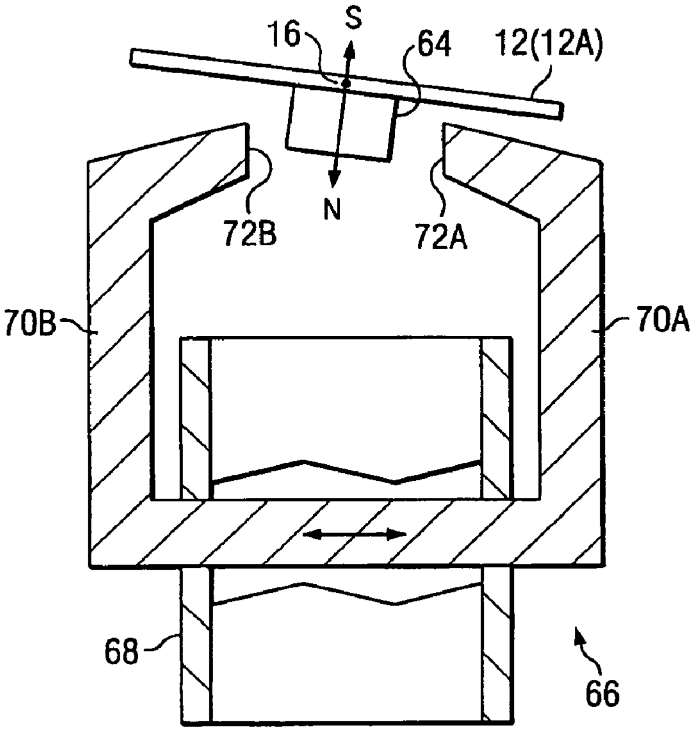

Various drive techniques and/or mechanisms may be used to generate the resonant frequency in a torsional hinged device, including mirrors. As discussed above, such drive techniques or mechanisms include magnetic, piezoelectric, etc. However, magnetic drives have been found to be particularly suitable for driving the presently available mirrors. FIGS. 4A, 4B and 4C illustrate three different magnetic drives that are particularly suitable for use with the present invention.

FIG. 4A is a schematic diagram illustrating how the resonant sweep and/or the orthogonal motion is controlled by electromagnetic coils 54*a* and 54*b*. To provide the resonant pivoting motion, the coils 54*a* and 54*b* are driven by a voltage source 56, which according to one embodiment has a frequency substantially the same as the resonant frequency of the mirror. Alternatively, the mirror can be oscillated at its resonant frequency by the application of a synchronized energy pulse to the magnetic coil (or coils) by voltage source 56. The permanent magnet sets 20*a* (30*a*) and 20*b* (30*b*) may be bonded to the mirror 12 (or gimbals member 24) such that they cooperate with electromagnetic coils 54*a* and 54*b*. Thus, assuming an alternating voltage is provided by source 56, as the two coils 54*a* and 54*b* switch back and forth between north and south polarities, the permanent magnets 20*a* and 20*b* are alternately repelled and attracted to create the movement and/or resonant oscillation. Likewise, by providing a synchronized pulse (positive or negative as appropriate), the mirror may be established and maintained at its resonant frequency. If the coil arrangement and magnet pairs are to provide orthogonal movement, a much slower frequency is used.

Referring now to FIG. 4B, there is a simplified illustration of a pivoting mirror 12 and another coil and permanent magnet arrangement that significantly reduces the moment of inertia of the apparatus. As shown, the two permanent magnets have been eliminated and a single magnet 57 is centrally mounted on the pivoting mirror (such as shown in FIG. 2B). According to the embodiment shown in FIG. 4B, magnet 57 has a diametral charge that is perpendicular to the axis of rotation, as illustrated by double-headed arrow 58, rather than an axial charge. It will, of course, also be necessary to relocate the drive coil 60 of the electromagnetic device 62 so that it is substantially below magnet 57. Therefore, as the electromagnetic device 62 switches back and forth between a north and south polarity, the "N" and "S" diametrally charged poles of permanent magnet 57 are alternately repelled and attracted thereby causing pivotal oscillations about axis 16.

FIG. 4C shows a second drive arrangement suitable for use with a single magnet centrally located. As shown, an axial charged magnet 64 is used instead of the diametral charged magnet of FIG. 4B. Further, the coil 60 shown in FIG. 4B is replaced by an electromagnetic arrangement 66, having a coil 68 and leg members 70*a* and 70*b* that extend from the coil 68 to tips 72*a* and 72*b* on each side of the magnet 64. Thus, an alternating current or a synchronized energy pulse having a proper polarity applied to coil 68 causes the magnetic field at the tips 72*a* and 72*b* of legs 70*a* and 70*b* to continuously change polarity. This change in polarity creates alternating push-pull forces on magnet 64.

Figure 5:
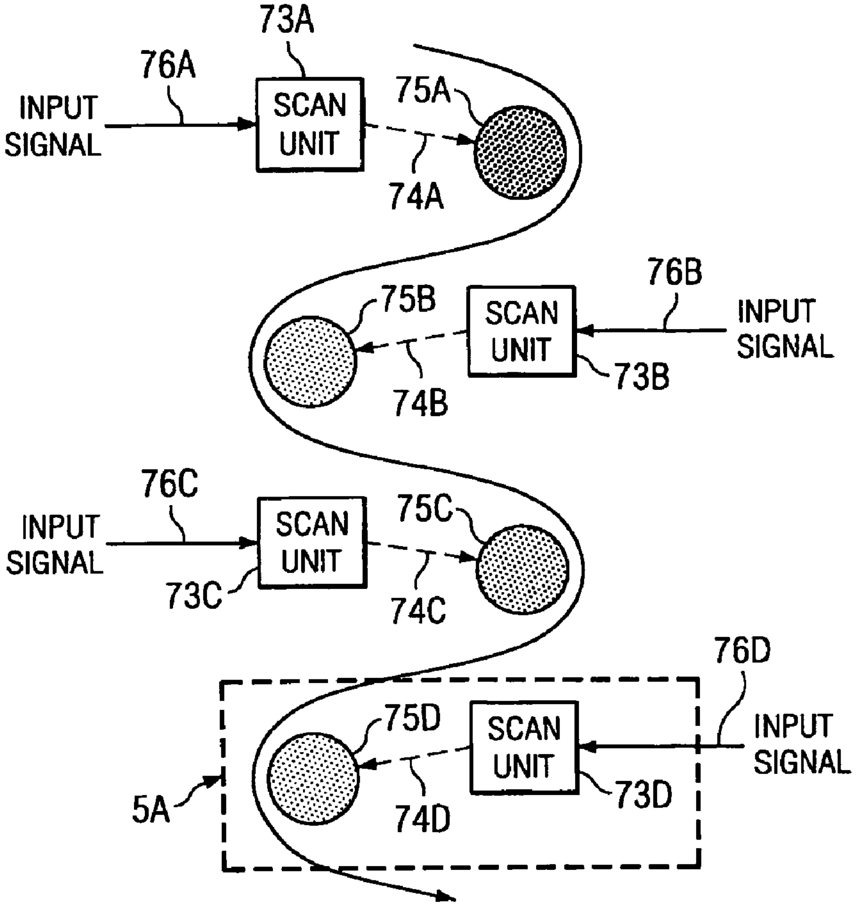
FIG. 5 illustrates a typical color printer and the paper path past two or more scan units.

As was discussed above, torsional hinged resonant mirrors are particularly useful as the scan unit for monochromic (for example, black ink) laser printers. However, torsional hinged resonant mirrors provided as scan units present new challenges for color printing not present in the old polygon mirror printers. More specifically, to print color images at high speeds, printer manufacturers typically rely on four polygon mirror laser scan units arranged in series to provide four different beam sweeps. One scan unit provides black, and the other three scanner units are selected to provide modulated light beams of three different primary colors. The four different scan units are coordinated and carefully aligned to provide a high-quality color print. More specifically, FIG. 5 illustrates a typical paper path for a color printer. As shown, the paper path runs serially past four scan units at print stations 73*a*, 73*b*, 73*c* and 73*d* for providing four separate modulated beam sweeps 74*a*, 74*b*, 74*c* and 74*d* (one black and three selected primary colors) that impinge on photoresistive drums 75*a*, 75*b*, 75*c*, and 75*d*. Further, since the resulting image lines generated by the four sweeping light beams at each print station must be precisely aligned with the image lines generated by the other print stations, the speed that the paper passes each print station is maintained constant. As mentioned, current systems use four polygon scan mirrors (not shown) as the scan units at each printer station. These four polygon mirrors rotate at the same speed and the paper feed rate along the path is matched in all areas. It is, of course, important that the speed of all four of the polygon mirrors in the four scan units be synchronized if paper feed discontinuities are to be avoided. Fortunately, such speed synchronization presents no particular problems for the polygon mirrors. This is because the various types of drive motors for the polygon mirrors, such as stepper motors or motors controlled by feedback can be precisely and easily controlled. For example, input signals, such as timed energy pulses, on control lines 76*a*, 76*b*, 76*c*, and 76*d* can be used to drive each of the four stepper motors at the same speed. This, of course, means the four modulated beams also sweep across the phtoresistive medium (e.g. rotating drums at the same speed).

Unfortunately, maintaining the beam sweeps of all four scan units at a constant speed is more complicated for torsional hinged mirrors. More specifically, torsional hinged pivoting mirrors are high Q resonant oscillators that have resonant frequencies that typically will vary slightly from one mirror to the other even though the mirrors are intended to be identical. The mirrors are typically manufactured from a silicon wafer using various processes common with the manufacture of semiconductor devices. Consequently, variations in the wafer thickness, location of the mirror die on the wafer, details of the lithography process and slight inconsistencies in the etching processes can all affect the resulting hinge dimensions, which of course affects the resonant frequency of a MEMS resonant device or mirror. The difference in resonant frequency of such torsional hinged mirrors may be only a few Hz different, such as for example, less that 5% different and typically about ±3%. Unfortunately however, if the design goal for the resonant frequency of a printer mirror is 2 kHz±3%, then 3% of 2 kHz is 60 Hz or a total of 120 Hz. Therefore, if all four mirrors are allowed to oscillate at their individual resonant frequencies, and the resonant frequencies vary by no more than 3%, the speed discontinuities or adjustments required to compensate for such variations would require very expensive paper path mechanisms.

Figure 5A:
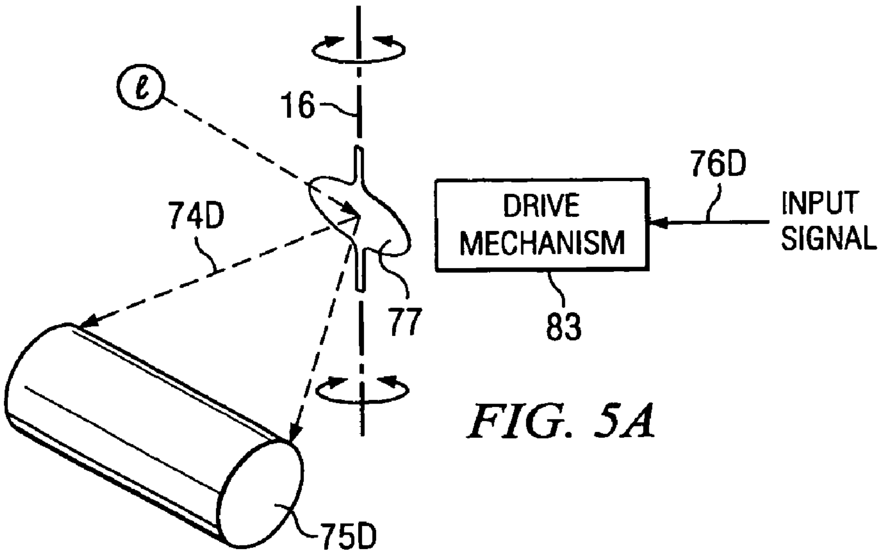
FIG. 5A illustrates the use of torsional hinged mirrors as the scan units.
Figure 6A:
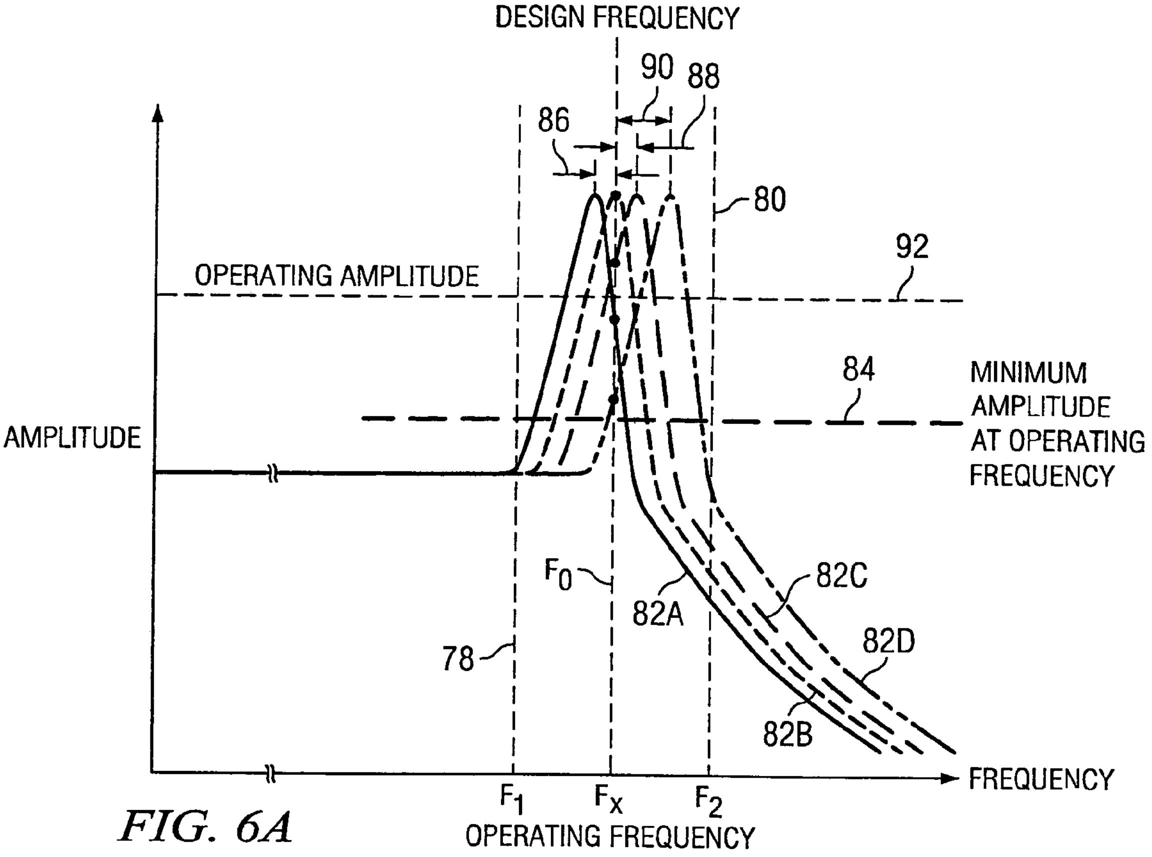
FIGS. 6A and 6B illustrate the design limits of mirrors suitable for use according to the present invention.

Therefore, according to the present invention, resonant MEMS torsional hinged mirrors are used to provide the modulated beam sweeps for scan units 73*a*, 73*b*, 73*c*, and 73*d*. These torsional hinged mirrors are designed with sufficient drive efficiency so that the mirror can be driven or efficiently operated at a frequency different than its resonant frequency and within a selected frequency band. The selected frequency band represents a large percentage of the range of resonant frequencies resulting from process or manufacturing variations. More specifically, and as shown in FIGS. 5 and 5A, all of the scan units 73*a*, 73*b*, 73*c*, and 73*d* include torsional hinged mirrors, such as torsional hinged mirror 77 for directing a sweeping light beam 74*d* along the length of photoresistive drum 75*d* as shown in FIG. 5A. Further as shown in FIG. 6A, each of the torsional hinged mirrors in scan units 73*a*, 73*b*, 73*c*, and 73*d* are designed to have a resonant frequency that is within a selected frequency band $F_1$ and $F_2$ as indicated at by dashed line 78 and 80 of FIG. 6A. Further, the frequency band limits $F_1$ and $F_2$, are close enough to a design or center frequency $F_0$ so that all of the torsional hinged mirrors in scan units 73*a*, 73*b*, 73*c*, and 73*d* represented at 82*a*, 82*b*, 82*c* and 82*d* respectively, can all be driven by drive mechanism 83 at a selected frequency in response to an input or control signal provided on control line 76*d* as show in FIG. 5A. The electrical frequency is synchronized to the paper feed speed or rate and such that the beam sweep will still have a minimum oscillation amplitude $A_1$ as indicated by the dashed line 84 of FIG. 6A. For example, if at least two mirrors are used, each of the at least two mirrors will have a resonant frequency within the band of frequencies $F_1$ and $F_2$ so that each of the mirrors can be driven at a frequency rate different from their resonant frequency, but that matches the oscillation frequency of the other mirror (or mirrors) while still having a minimum oscillation amplitude $A_1$ (line 84) as required by the printer. Thus, if four mirrors are required, all four of the mirrors may be driven to a common or related frequency between $F_1$ and $F_2$ that is off of their resonant frequency. Alternately, one mirror of the four may be selected to operate at its resonant frequency and the other three mirrors driven to the resonant frequency of the selected mirror. For example, referring again to FIG. 6A, if the center frequency $F_x$ of a mirror represented by the curve 82*b* is the selected frequency and in the illustrated embodiment $F_x=F_0$, then the frequency of the mirror represented by the curve 82*a* must be increased as indicated by arrow 86. However, the frequency of the mirrors represented by curve 82*c* and curve 82*d* must be decreased as indicated by arrows 88 and 90. By using robust magnetic drive coils, the three mirrors may readily be driven to the center frequency $F_x$ of the mirror represented by curve 82*b*. It should be appreciated that although the center frequency $F_x$ of the mirror represented by curve 82*b* is the same as the design frequency $F_0$ in the illustrated embodiment, this is not necessary. Actually and as shown in FIG. 6A, all of the mirrors represented by curves 82*a*, 82*b*, 82*c*, and 82*d* are within the selected frequency level. Consequently any one of the mirrors could be selected to operate at its resonant frequency $F_x$ such that the other mirrors are driven off of their resonant frequency to also oscillate at $F_x$.

Figure 6B:
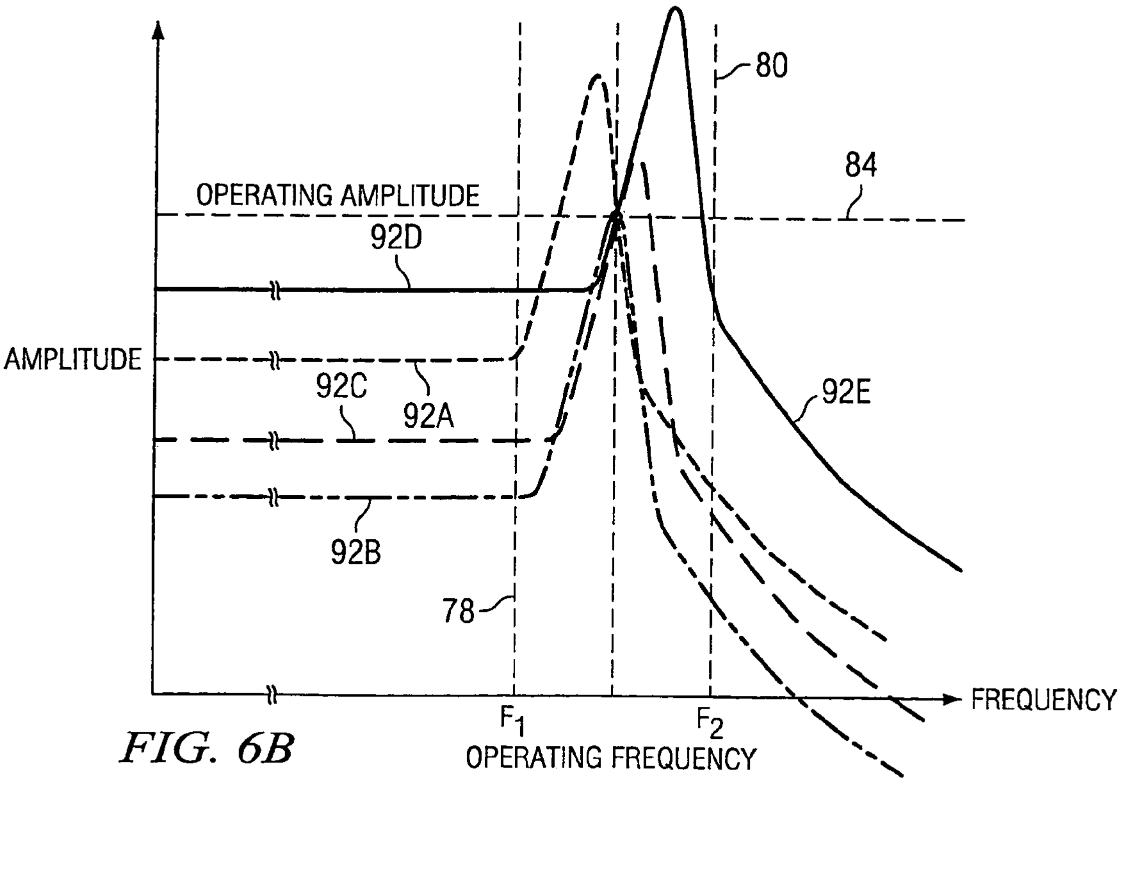

As was mentioned, it is also important that the print amplitude in each direction for all of the mirrors remain at or above a selected threshold level 84 at all frequencies within the frequency $F_1$ and $F_2$. However, as will be appreciated, and as shown in FIG. 6B, the pivotal rotation (or amplitude) represented by curves 92*a*, 92*b*, 92*c*, 92*d* show how the amplitude of the mirrors will decrease rapidly as the resonant mirror is driven off of the resonant frequency unless the energy provided by the drive coil is increased. Thus, as shown in FIG. 6B, the design of the mirrors and the drive coils must be selected so that all of the mirrors are not only within the selected frequency $F_1$ and $F_2$, but that the amplitude of each mirror represented by curves 92*a*, 92*b*, 92*c*, and 92*d* will remain above a minimum threshold level 84 when driven off of its resonant frequency to operate at its selected frequency $F_x$.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for providing at least two beam sweeps comprising:

at least two torsional hinged resonant mirrors, each mirror having a resonant oscillation frequency about said torsional hinge within a selected band of frequencies and each mirror maintaining at least a minimum selected oscillation amplitude across said frequencies within said selected band of frequencies;

a drive mechanism for each of said at least two torsional hinged mirrors to establish and maintain oscillations of said at least two mirrors at a selected frequency within said selected band of frequencies in response to an input signal; and an input signal provided to said drive mechanisms such that each of said drive mechanism operates one or said at least two resonant mirrors at said selected frequency and with an oscillation amplitude above a selected value.

2. The apparatus of claim 1 wherein said selected frequency is a value between the minimum and maximum resonant frequencies of the at least two torsional hinged mirrors.

3. The apparatus of claim 1 wherein said at least two torsional hinged resonant mirrors are MEMS devices.

4. The apparatus of claim 1 wherein said at least two torsional hinged resonant mirrors comprise four torsional hinged resonant mirrors.

5. The apparatus of claim 1 wherein said torsional hinged mirrors are single axis full hinged mirrors.

6. The apparatus of claim 1 wherein said torsional hinged mirrors are dual axis full hinged mirrors.

7. The apparatus of claim 1 wherein said torsional hinged mirrors are single axis half hinged mirrors.

8. The apparatus of claim 1 wherein said selected frequency is the resonant frequency of one of said at least two torsional hinged mirrors.

9. The apparatus of claim 4 wherein said selected frequency is the resonant frequency of one of said four torsional hinged mirrors.

10. A method of operating at least two torsional hinged resonant mirrors at the same frequency comprising the steps of:

providing at least two torsional hinged resonant mirrors, each having a resonant oscillation frequency within a selected band of frequencies and each mirror maintaining at least a minimum selected oscillation amplitude across all frequencies within said selected band of frequencies;

establishing and maintaining oscillations of said at least two torsional hinged mirrors at a selected frequency within said band of frequencies in response to an input signal; and providing said input signal for establishing and maintaining the oscillation of said at least two torsional hinged mirrors at said selected frequency and with an oscillation amplitude above a selected value.

11. The method of claim 10 further comprising the step of selecting said frequency from the frequencies lying between the maximum and minimum frequencies of the at least two torsional hinged mirrors.

12. The method of claim 10 wherein said at least two torsional hinged mirrors are MEMS devices.

13. The method of claim 12 wherein said at least two torsional hinged resonant mirrors comprise four torsional hinged resonant mirrors.

14. The method of claim 10 wherein said selected frequency is the resonant frequency of one of said at least two torsional hinged mirrors.

15. The method of claim 13 wherein said selected frequency is the resonant frequency of one of said four torsional hinged resonant mirrors.

16. Printing apparatus comprising:

at least two separate modulated light beams;

at least two torsional hinged mirrors for reflecting one each of said at least two modulated light beams, each mirror having a resonant frequency about said torsional hinge within a selected band of frequencies and each mirror maintaining at least a minimum selected oscillation amplitude across all frequencies within said selected band of frequencies;

at least two drive mechanisms, one for each of said at least two torsional hinged mirrors to establish and maintain oscillations at a selected frequency within said selected band of frequencies in response to an input signal such that said reflected light beams sweep back and forth;

an input signal provided to each of said drive mechanisms such that said drive mechanisms operate both mirrors at said selected frequency and with an oscillation amplitude above a selected value; and a light sensitive medium for receiving said two light beams and for moving orthogonal to said sweeping light beams.

17. The printing apparatus of claim 16 wherein said at least two torsional hinged resonant mirrors comprise four torsional hinged resonant mirrors.

18. The printing apparatus of claim 16 wherein said torsional hinged mirrors are single axis full hinged mirrors.

19. The printing apparatus of claim 16 wherein said torsional hinged mirrors are single axis half hinged mirrors.

20. The printing apparatus of claim 16 wherein said selected frequency is the resonant frequency of one of said at least two torsional hinged mirrors.

21. Apparatus for color printing comprising:

four separate modulated light beams;

four torsional hinged mirrors for reflecting one each of said four modulated light beams, each mirror having a resonant frequency about said torsional hinge within a selected band of frequencies and each mirror maintaining at least a minimum selected oscillation amplitude across all frequencies within said selected band of frequencies;

a drive mechanism for each of said four torsional hinged mirrors to establish and maintain oscillations at a selected frequency within said selected band of frequencies in response to an input signal such that said reflected light beams sweep back and forth;

an input signal provided to each of said drive mechanisms such that said drive engines operate all four mirrors at said selected frequency and with an oscillation amplitude above a selected value; and a light sensitive medium for receiving said four light beams and for moving orthogonal to said sweeping light beams.

22. The color printing apparatus of claim 21 wherein said torsional hinged mirrors are single axis full hinged mirrors.

23. The color printing apparatus of claim 21 wherein said torsional hinged mirrors are single axis half hinged mirrors.

24. The color printing apparatus of claim 21 wherein said four modulated light beams correspond one each to black and three selected primary colors.

* * * * *